United States Patent
Ouyang et al.

(10) Patent No.: US 6,489,705 B1
(45) Date of Patent: Dec. 3, 2002

(54) THIN-DISC PIEZOELECTRIC ACTUATING ULTRASONIC MOTOR

(75) Inventors: Minsun Ouyang, Hsinchu (TW); Fuh-Liang Wen, Hsinchu Hsien (TW)

(73) Assignee: National Science Council of Republic of China, Taipei (TW)

( * ) Notice: Subject to any disclaimer, the term of this patent is extended or adjusted under 35 U.S.C. 154(b) by 0 days.

(21) Appl. No.: 09/888,422

(22) Filed: Jun. 26, 2001

(51) Int. Cl.$^7$ ................................................ H01L 41/08
(52) U.S. Cl. ............................ 310/323.02; 310/316.01; 310/328
(58) Field of Search ............................ 310/328, 323.02, 310/316.01, 316.02, 317

(56) References Cited

U.S. PATENT DOCUMENTS

| | | | | |
|---|---|---|---|---|
| 4,999,536 A | * | 3/1991 | Toda | 310/323.02 |
| 5,008,581 A | * | 4/1991 | Kumada et al. | 310/323.02 |
| 5,073,739 A | * | 12/1991 | Iijima et al. | 310/323.02 |
| 5,561,337 A | * | 10/1996 | Toda | 310/316.01 X |
| 6,064,140 A | * | 5/2000 | Zumeris | 310/316.01 X |
| 6,104,122 A | * | 8/2000 | Ishimaru | 310/323.02 |

* cited by examiner

Primary Examiner—Mark O. Budd
(74) Attorney, Agent, or Firm—Bacon & Thomas

(57) ABSTRACT

A thin-disc piezoelectric actuating ultrasonic motor includes a stator made up of a commercially available piezoelectric element that includes a piezoelectric ceramic membrane bonded on a metal plate to form a concentric disk. An ultrasonic motor driving mechanism induces mechanical vibration in the piezoelectric element by extension and shrinkage of the metal back plate, upon application of single phase AC power. There are two propagating directions in the induced mechanical vibrating wave. One is a radial component, and the other is a transverse component. The outer edge of the piezoelectric element thus forms traveling waves in different directions. These traveling waves may be used to provide a torque so as to drive the rotor to rotate.

12 Claims, 11 Drawing Sheets

THIN-DISC PIEZOELECTRIC ACTUATING ULTRASONIC MOTOR

FIELD OF THE INVENTION

The present invention relates to a thin-disc piezoelectric actuating ultrasonic motor, wherein an AC voltage is inputted into a piezoelectric element consisting of a piezoelectric ceramic and metal back plate. The piezoelectric ceramic generates a pull or push effect due to the reverse piezoelectric effect and the metal back plate in the piezoelectric element is driven to vibrate. The generated mechanical wave propagates in radial or transverse directions. As the wave propagates, each screw forms a reflecting point. Due to the reflecting points from three peripheral screws, traveling waves of different directions are formed by the piezoelectric buzz piece at the outer edge of the metal back plate. One of the traveling waves is used to provide a torque to cause the rotor to rotate.

BACKGROUND OF THE INVENTION

The currently used ultrasonic motor is primarily formed by a piezoelectric (PZT) ceramic 12 made of a zirconium-titanium-acid-lead material, as illustrated for example in FIG. 1. After a voltage is inputted into the piezoelectric ceramic 12, the piezoelectric ceramic 12 and the metal back plate 11 will be forced to generate a mechanical extension-contraction phenomenon. Energy is transferred in a wave form. The piezoelectric ceramic operates within an ultrasonic frequency having an amplitude of several micrometers which is controllable by input voltage. Therefore, it can be used as a driving device or a driving motor of a compact structure or system.

The aforesaid ultrasonic motor may generate an alternating extension-contraction function by AC power. By mechanical design, motions in specific directions are generated. The moving distance in each period is only several micrometers. Under the vibration of the ultrasonic frequency, a displacement of several centimeters per second is generated for driving precise devices (such as automatic focusing means of a camera, positioning devices for fine machining, etc.). Meanwhile, the ultrasonic motor has the features of small volume, light weight, low noise, low speed with a high torque, high retaining force, quick response, insensitivity to electromagnetic interference, and so forth. Different advantages may be emphasized in different products, such as lower speed, high torque, high retaining force, and low noise in products designed for use in silent places (such as hospitals); quick response in products requiring driving a X-Y platform, and insensitivity to electromagnetic waves in products for use in magnetic floating vehicles and biomedical technology.

The prior art ultrasonic motors or actuators are made of piezoelectric bulk material or piezoelectric stacking pieces, however, that have a high cost, so that the commercial ultrasonic motor has a high price.

SUMMARY OF THE INVENTION

Accordingly, the primary object of the present invention is to provide an ultrasonic motor including a piezoelectric element into which is inputted an AC voltage. The piezoelectric ceramic in the piezoelectric element generates a pull-push effect due to a reverse piezoelectric effect and a metal back plate in the piezoelectric element is driven to vibrate. The generated mechanical wave propagates or transfers along a radial or transverse path. As the wave propagates, each screw in the back plate can be formed as a reflecting point. Due to the reflecting points from three peripheral screws, traveling waves of different directions can be formed by the piezoelectric element at the outer edge. One of the traveling waves is used to provide a torque to drive a rotor to rotate.

Another object of the present invention is to provide a thin-disc piezoelectric actuating ultrasonic motor, that can be used in semiconductor equipment, medical instruments, hard disk drives and CD drives, and that has a low cost and high efficiency.

To achieve the above objects, the present invention provides a thin-disc piezoelectric actuating ultrasonic motor, wherein a main electrode is covered at the uppermost surface of a piezoelectric element or ceramic, and the lowest end of the piezoelectric element is adhered to a metal back plate. In operation, AC power is inputted between the main electrode and the metal back plate. The piezoelectric ceramic will extend or shrink due to the reverse piezoelectric effect. In contrast to a conventional "speaker", in which the metal back plate is deformed by the piezoelectric ceramic so as to vibrate air for emitting a sound, at a working frequency of between 50 and 20 kHz, in the present invention, the piezoelectric element is used as a driver operating at a frequency of over 30 kHz. The working principle is that the piezoelectric element is used to vibrate the periphery of the metal back plate for driving the rotor to rotate.

In the thin-disc piezoelectric actuating ultrasonic motor of the present invention, the piezoelectric element including the metal back plate is fixed to a rectangular piece by three asymmetric screws. Then one side of the fixed rectangular piece is fixed to another rectangular piece larger than the former one by a plurality of screws and a spring so that an elastic resilient structure is formed between the two rectangular pieces. Then an AC current is inputted into the piezoelectric element so that the piezoelectric ceramic will extend and contract due to the reverse piezoelectric effect of the ceramic and drive the metal back plate to vibrate. The mechanical waves are transferred along the radial and transverse directions. The outer edge of the piezoelectric element generates traveling waves along different directions. The traveling waves will provide a torque to drive the rotor to rotate.

The piezoelectric element forms a motor stator consisting of the above-mentioned two major elements: one is a piezoelectric ceramic and another is a metal back plate. The principle of either standing or traveling waves in a stator is that an AC voltage applied to the main electrode of the piezoelectric element causes the piezoelectric ceramic as the main actuating body of the stator to generate a reverse piezoelectric effect to vibrate the metal back plate. Therefore, wave energy is transferred to the stator. The oscillation of friction material on the stator causes the shaft of a rotor to be rotated along the wave traveling direction. The traveling wave is generated because a disc with a single frequency can be formed to provide multiple reflections of the specific frequency. The intersection of these reflecting waves will form wave motions at a specific section.

The various objects and advantages of the present invention will be more readily understood from the following detailed description when read in conjunction with the appended drawings.

DETAILED DESCRIPTION OF THE PREFERRED EMBODIMENTS

Figure 1:
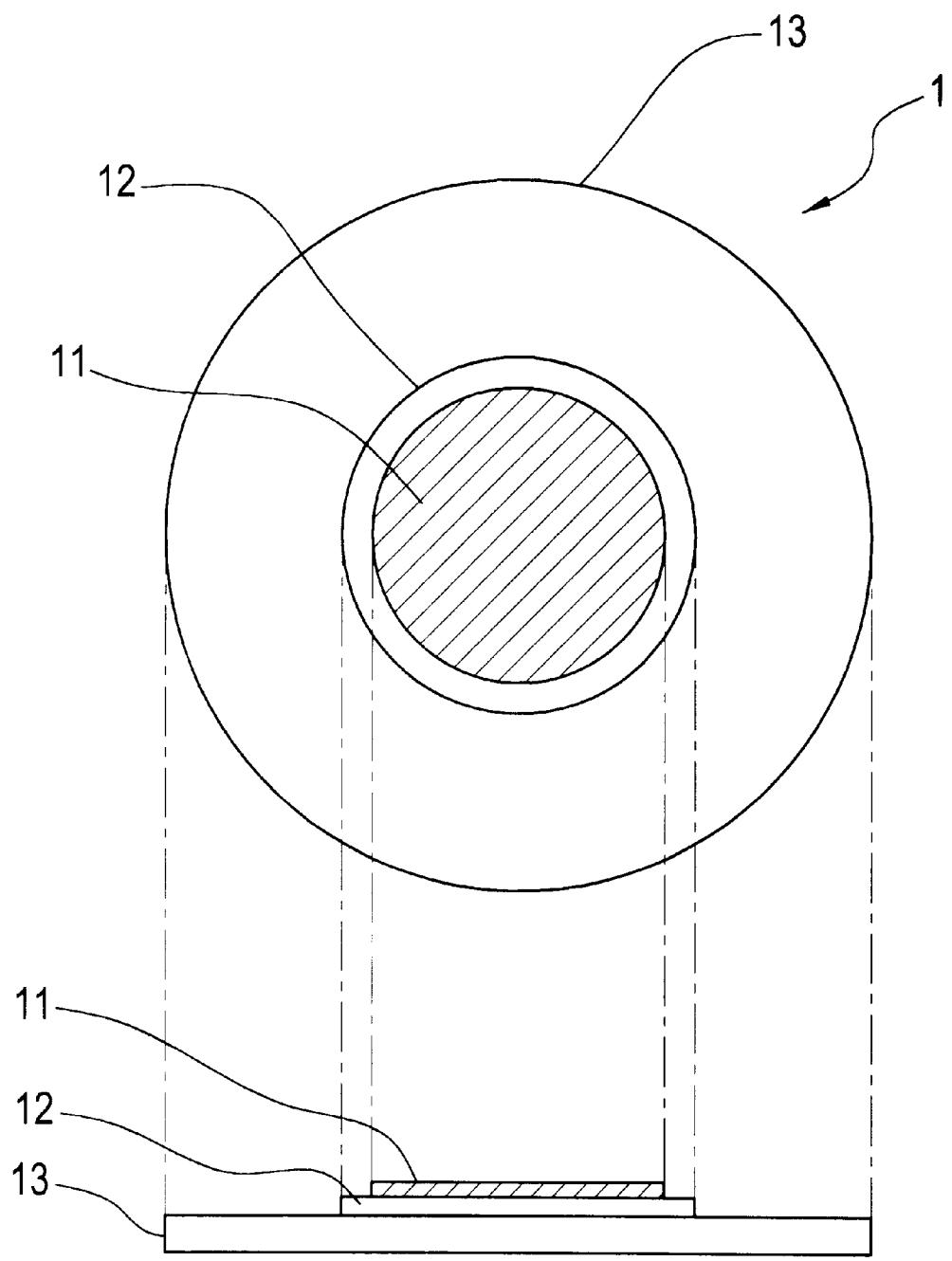
FIG. 1 shows a piezoelectric element used in a thin-disc piezoelectric actuating ultrasonic motor according to a first preferred embodiment of the present invention.
Figure 2:
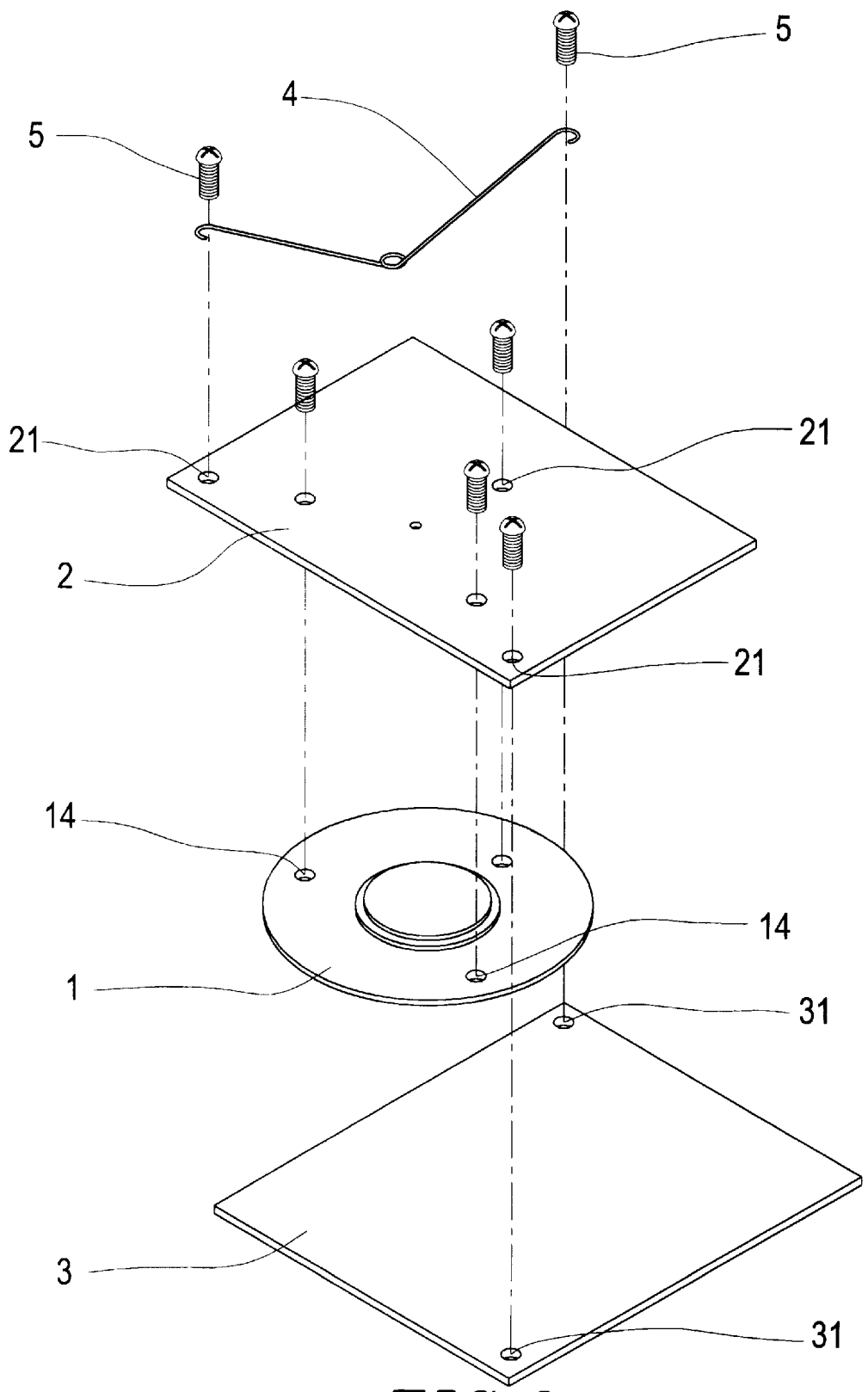
FIG. 2 is an exploded perspective view of the thin-disc piezoelectric actuating ultrasonic motor of the first preferred embodiment.
Figure 3:
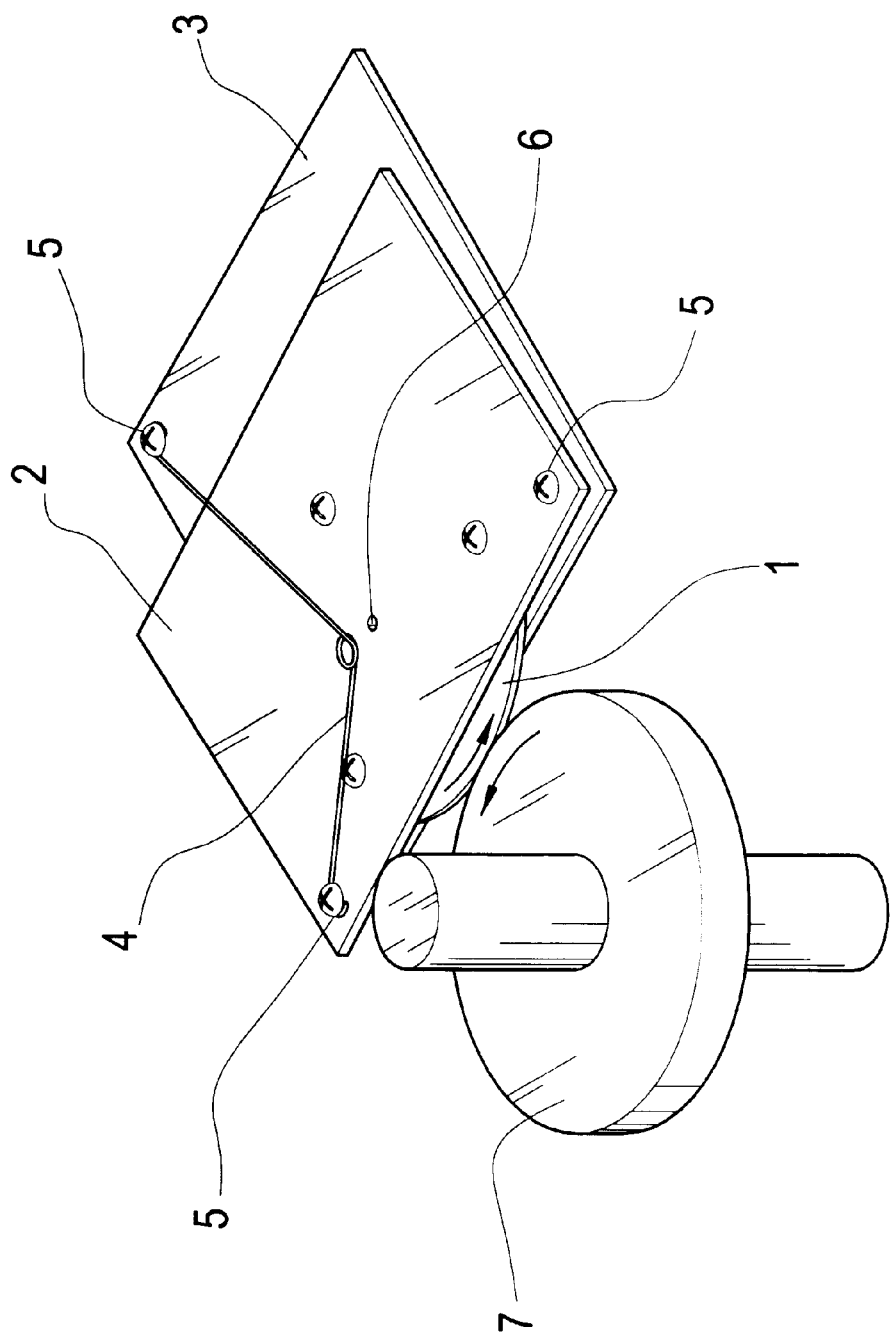
FIG. 3 is an assembled perspective view of the preferred thin-disc piezoelectric actuating ultrasonic motor of FIG. 2.
Figure 4:
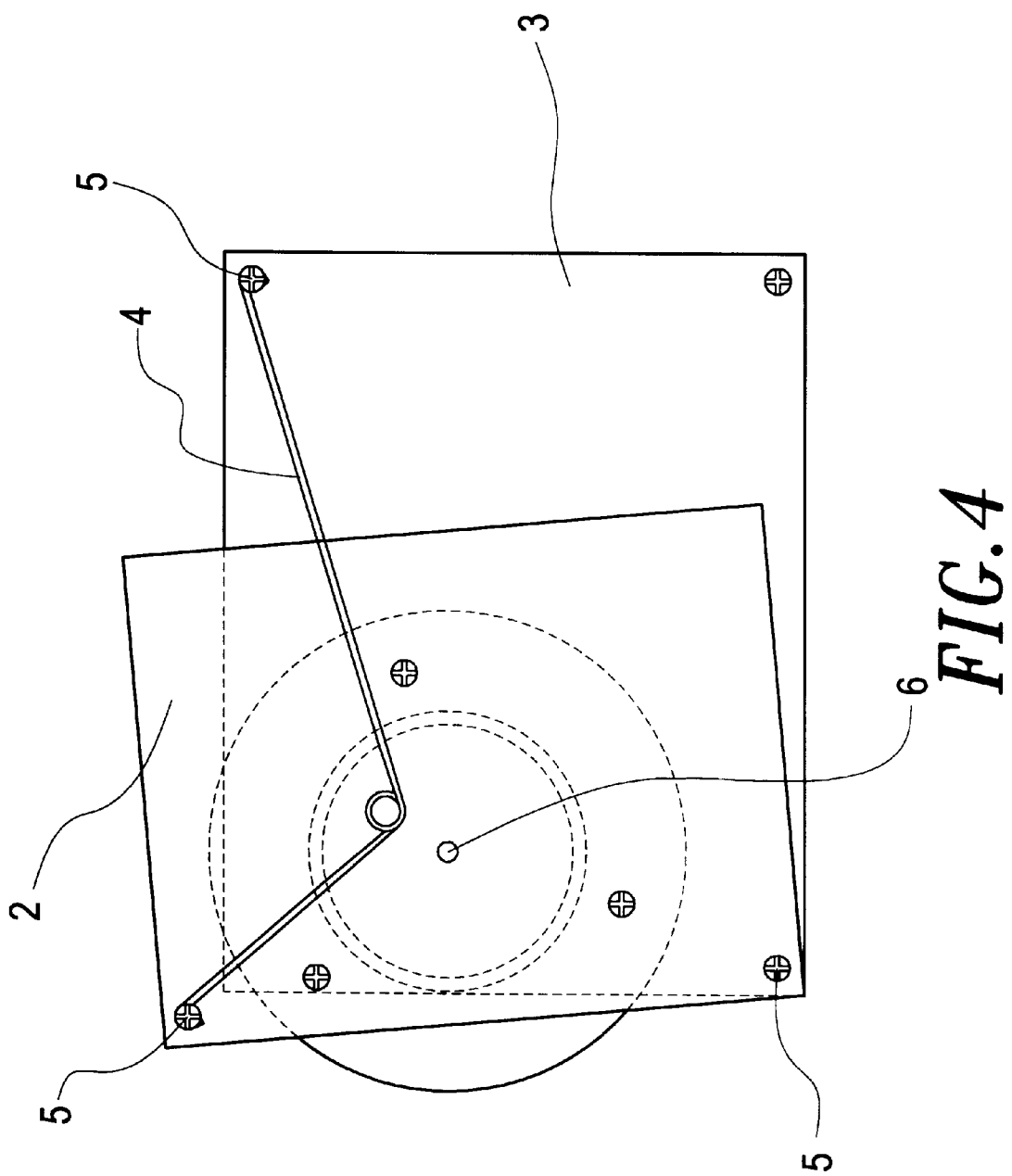
FIG. 4 is an elevation view of the thin-disc piezoelectric actuating ultrasonic motor of FIG. 2.

FIGS. 2, 3 and 4, illustrate a thin-disc piezoelectric actuating ultrasonic motor according to a first preferred embodiment of the present invention. The thin-disc piezoelectric actuating ultrasonic motor of FIGS. 2–4 includes a piezoelectric element 1 (shown in detail in FIG. 1), a first fixing plate 2, a second fixing plate 3, a spring 4, a plurality of screws 5 and a lead 6. The piezoelectric element 1 is fixed to the first fixing plate 2 by the screws 5 at three asymmetric positions passing through the though hole 21. At one side of the piezoelectric element 1, the first fixing plate 2 is fixed to the larger second fixing plate 3 by the spring 4 using respective screws 5 passing through the though holes 21 and 31 so that the connection between the first fixing plate 2 and second fixing plate 3 is elastic. The main electrode of the piezoelectric element 1 is connected to the lead 6. In the present invention, the piezoelectric element is excited externally. The voltage input portion has only a main electrode 11. AC power is inputted between the lead 6 of the main electrode 11 and the second fixing plate 3. In use, the second fixing plate 3 is held by hand or is fixed to a specific position. The piezoelectric element 1 is in contact with a rotor 7 so that the rotor 7 is driven to rotate.

By the aforesaid structure, the piezoelectric element 1 is used as a medium for converting electrical energy in the form of an inputted AC voltage to mechanical energy. The piezoelectric ceramic generates a pull or push action due to the reverse piezoelectric effect and a metal back plate is driven to vibrate. The generated mechanical waves transfer along radial or transverse paths. In transferring the waves, each screw 5 can be formed as a reflecting point. Due to the reflecting points from the three screws 5 that peripherally fix the piezoelectric element to fixing plate 2, traveling waves of different directions can be formed by the piezoelectric element 1 at the outer edge. One of the traveling waves is used to provide a torque to drive the rotor 7 to rotate.

The basic working principle of the traveling wave is as follows: At first, an external voltage is applied to the main electrode 11 of the piezoelectric element 1 which forms the stator so that main body made of piezoelectric ceramic induces vibration of the element via a reverse piezoelectric effect, setting up a traveling wave in the stator. By the stick-sliding effect of the frictional force between the stator and rotor, the rotor 7 moves along the wave traveling path. The generation of the traveling wave is formed by a disk oscillation of a single frequency, and a specific boundary condition that causes a multiple reflection to be generated, the path difference of the reflecting wave forming the traveling wave.

Figure 5:
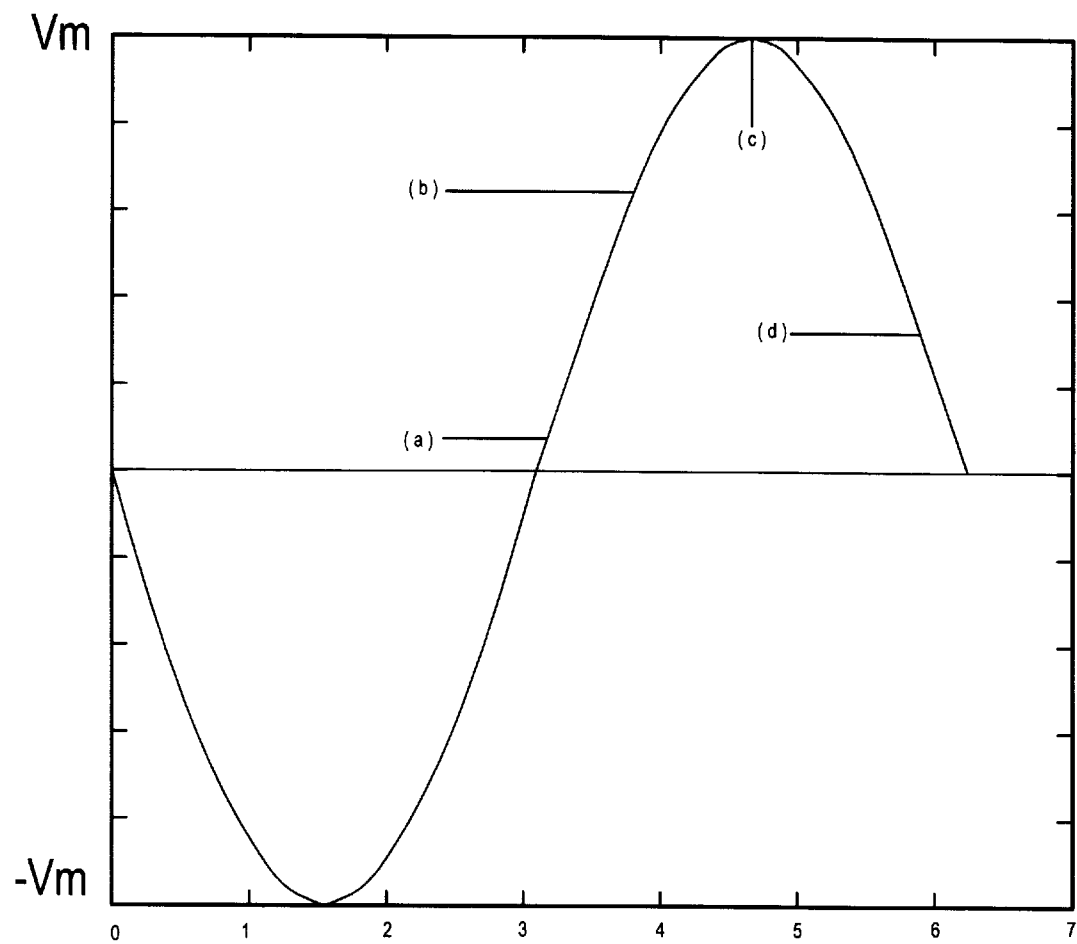
FIG. 5 is a schematic view showing a piezoelectric element input waveform.

In the present invention, a finite element analysis (FEA) is used to analyze the working principle of the ultrasonic motor. When a periodic voltage as illustrated in FIG. 5 is inputted, the motor stator will have a periodic deformation. According to the reverse piezoelectric effect, when the inputted voltage is at a positive half period or negative half period, the deformation orientation of the piezoelectric buzz piece 1 is respectively different. Therefore, in one-half of the period illustrated in FIG. 5, four points (a), (b), (c) and (d) represent checking points for periodic deformation. When the input voltage is $20V_{p-p}=2V_m$, and the frequency is 66.6 kHz, the periodic variation according to the amplitude of AC power is:

$(a) \rightarrow (b) \rightarrow (c) \rightarrow (d)$

Figure 6:
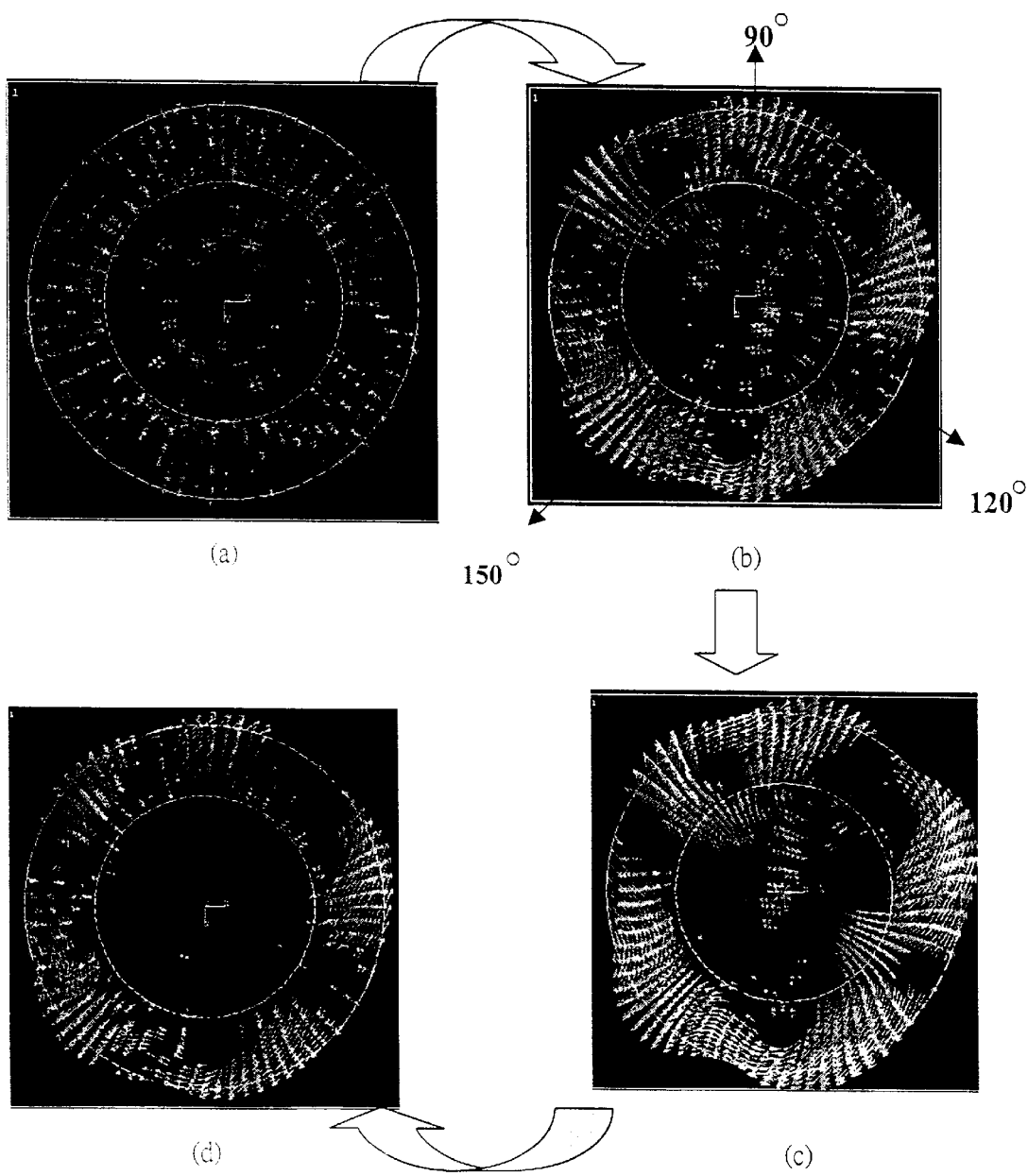
FIG. 6 shows a simulation of a piezoelectric element rotating counterclockwise.

The deformation of the ultrasonic motor is illustrated in FIG. 6. The order of the stator deformation is:

$(a) \rightarrow (b) \rightarrow (c) \rightarrow (d)$ (a) represents the point at which voltage is inputted initially (V=0+) and the piezoelectric stator is also deformed; (b) represents the region in which the inputted voltage is enlarged gradually (V=½Vm) and the piezoelectric stator deforms and enlarges; (c) represents a region in which the input voltage causes the piezoelectric stator to have a maximum deformation; (d) indicates the point where the input voltage attains a maximum value, and the deformation of the piezoelectric stator is reduced gradually ($V=½V_m$). In the negative half period, the piezoelectric stator is shrunk. From the simulation drawing, as the motor stator is at 90 degrees, the R and θ directions, will deform, and the variation of the deformation will enlarge with the change of the voltage. When the rotor is placed at a position in which the motor's stator is at 90 degrees, the stator will push the rotor to rotate counterclockwise. It is appreciated that at the 120 degrees, the deformation of the motor stator is toward the tow screws. At 150 degrees, the deformation of the motor stator is toward the middle portion of the two screws.

When the input voltage 20Vp-p=2Vm, and has a frequency of 76 kHz, the periodic variation according to the amplitude of AC power is:

$(a) \rightarrow (b) \rightarrow (c) \rightarrow (d)$

Figure 7:
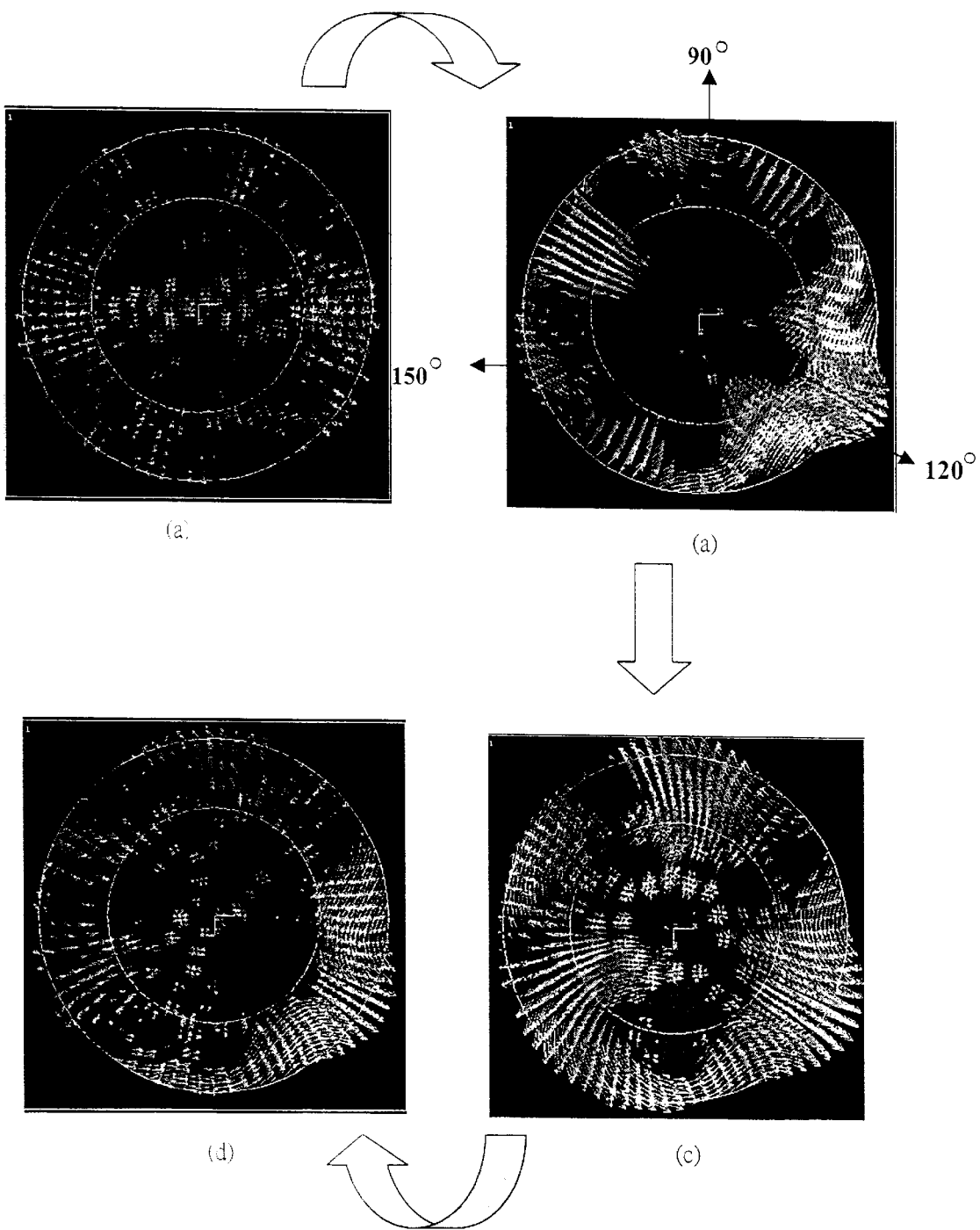
FIG. 7 is a simulation of the piezoelectric element rotating clockwise.

The deformation of the ultrasonic motor is illustrated in FIG. 7. The order of the stator deformation is:

$(a) \rightarrow (b) \rightarrow (c) \rightarrow (d)$

From the simulation drawing, when the deformation of motor stator is in the 90 degree region in the R and θ directions, the variation of the deformation will enlarge with the change in the voltage. When the rotor is placed at a position of the motor stator being in the 90 degree region and the input frequency is 76 kHz, the stator will push the rotor to rotate clockwise. It is appreciated that, on the 120 and 150 degree region, the deformation of the motor stator is opposite to that when the frequency is 66.6 kHz. Comparing the cases of input frequencies of 66.6 kHz and 76 kHz, from the deformation vector figure of the stator simulation, the driving mechanism in clockwise and counterclockwise rotation as illustrated in FIG. 8.

Figure 8A:
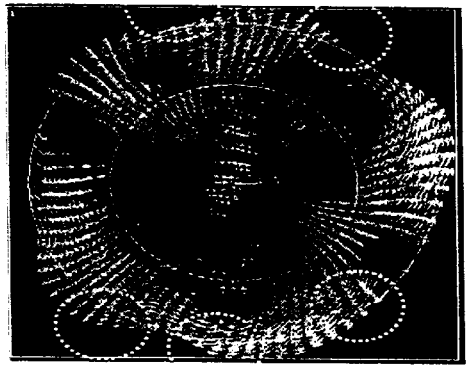
FIGS. 8(a) and 8(b) show a simulation of an edge-driving motion.
Figure 8B:
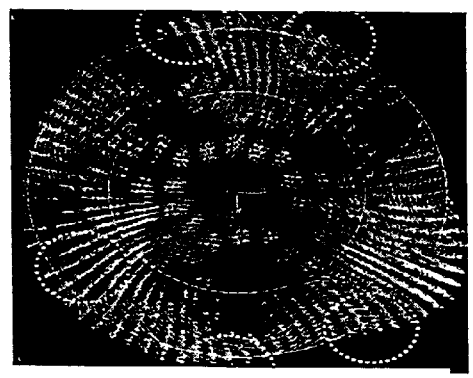

When the frequency is 66.6 kHz, the deformation in the driving section is along the R and θ directions. The deformation is rearwards as illustrated in FIG. 8(a). When the frequency is 76 kHz, the deformation is leftwards as illustrated in FIG. 8(b). When the rotor is pressed tightly against the driving point, and the frequency is 66.6 kHz, the rotor will be driven to rotate clockwise. When the frequency is 76 kHz, the rotor will move counterclockwise. Comparing the simulation figures of finite element analysis about 66.6 kHz and 76 kHz, when the frequency changes, in addition to the direction being reversed in the 90 region, the deformations in the 120 and 150 degree regions are interchanged. In the edge-driving type ultrasonic motor, a mixed mode of 3-mode and 4-mode is used to get a maximum lateral pushing effect.

Figure 12:
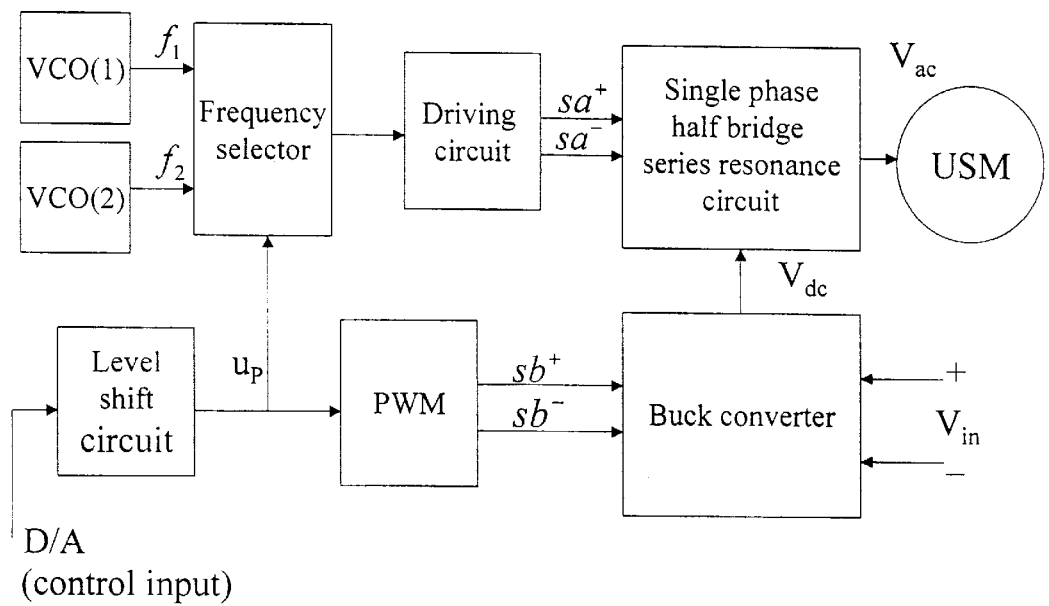
FIG. 12 is a system block diagram of a driving circuit.
Figure 13:
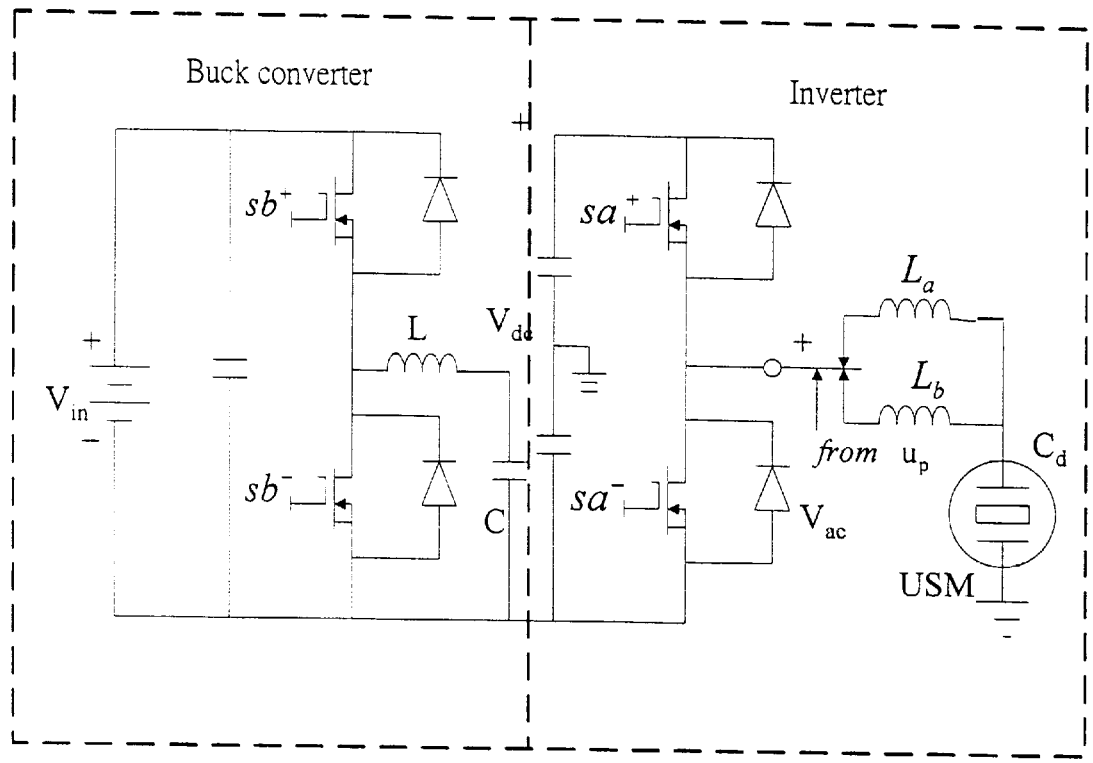
FIG. 13 is a circuit diagram of a power converter.

From the above analysis of the vibrating mode through finite element analysis, it can be appreciated that the displacement of the ultrasonic motor in the present invention is determined according to the amplitude of the voltage of the sinusoidal wave applied to the stator piezoelectric ceramic, and the rotational orientation is determined by the frequency of the sinusoidal voltage. To drive the ultrasonic motor effectively, a driving circuitais illustrated in FIG. 12 may be used. This design includes a voltage drop DC to DC buck converter and a single phase half bridge serial resonance inverter (referring to FIG. 13). The duty cycle of the voltage drop DC to DC buck converter is adjusted such that the output u of the controller of the personal computer is level-adjusted through a D/A conversion and thus a signal $u_p$ is controlled by a PWM circuit. The primary function of this signal up converter is to provide a DC voltage source to the half bridge serial resonance inverter which has set positive and negative rotating driving frequencies as the driving frequencies, and a fixed voltage amplitude of VCO(1) and VCO (2). By selection of the $u_p$ signal, when the $u_p$ signal is larger than zero (high), f1=(66.6 kHz) is selected, and the ultrasonic motor is rotated clockwise. When the $u_p$ signal is equal to zero (low), f2=(76 kHz) is selected, and the ultrasonic motor rotates counterclockwise.

Figure 9:
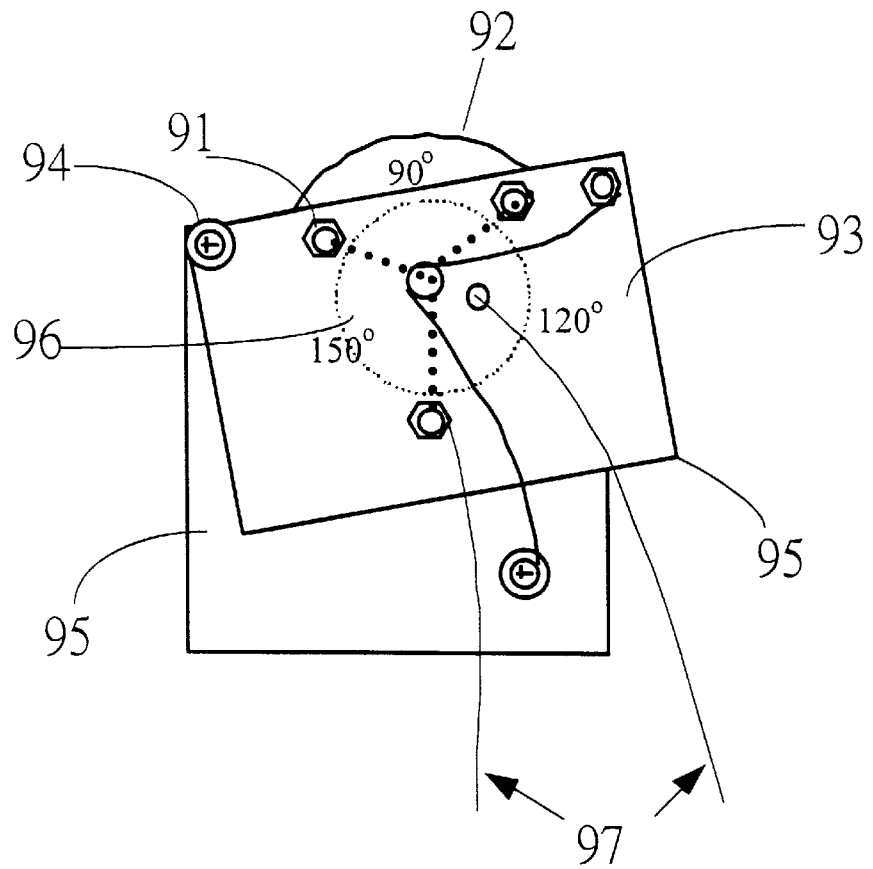
FIG. 9 shows the stator of an edge-driving ultrasonic motor according to a second preferred embodiment of the invention.

The mechanism of the edge-driving type ultrasonic motor is illustrated as FIG. 9. The diameter of the screw 91 is 2 mm. To assure reflection of the waves in the metal back plate 92, the screw 91 must be locked tightly. The preload spring 93 is designed to conform to the movable fulcrum 94. To assure that the stator and rotor may contact anytime, a good insulation must be formed between the fixing aluminum plate 95 and the piezoelectric ceramic 96 so as to prevent the driving power line 97 from shorting as it is connected to the driving power source.

Figure 10:
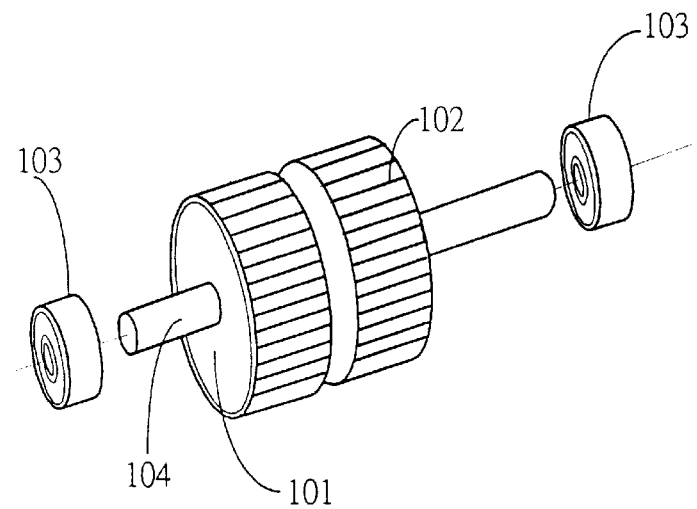
FIG. 10 shows the rotor of an edge-driving ultrasonic motor for use in connection with the stator of FIG. 9.
Figure 11:
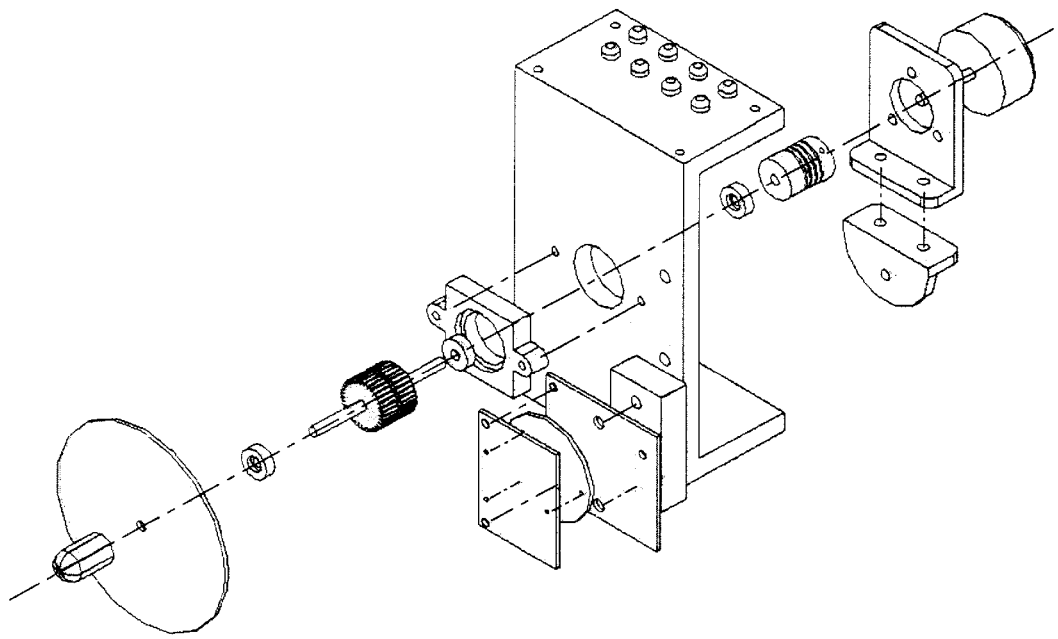
FIG. 11 shows the testing platform for assembly of an edge-driving ultrasonic motor.

For consideration of the precision in finishing and the balance of the motor rotor, the rotor of an existing small type step motor (used in a 5.25" floppy disk drive) is used as the rotor, as illustrated in FIG. 10. The body of the rotor 101 is a permanent magnet and has a saw tooth structure 102 at its surface for increasing the friction between the stator and the rotor and increasing the torque. Two ends of the rotary shaft 104 have bearings 103 for supporting the decoder and carrying a rotary disk at a position for measuring rotation of the motor rotor 101. FIG. 11 shows an exploded view of a prototype of the edge-driving type ultrasonic motor and test platform.

The difference between the single phase driving power of the thin-disc piezoelectric actuating ultrasonic motor of the present invention and conventional two phase type driving power is summarized in table 1, in which 10 items are listed.

The thin-disc piezoelectric actuating ultrasonic motor of the present invention has the following advantages as comparing with the prior art.

1. In the thin-disc piezoelectric actuating ultrasonic motor of the present invention, a piezoelectric element is used to make a driver and AC power is inputted into this piezoelectric element so that the piezoelectric ceramic generates a pushing force to drive the metal back place of the element to vibrate. The generated mechanical wave proceeds along the radial and transverse directions. Traveling waves are formed at the outer edges of the piezoelectric element in different directions so as to provide a torque to drive the rotor to rotate.

2. In the thin-disc piezoelectric actuating ultrasonic motor of the present invention, only a single phase driving power is used to complete the clockwise and counterclockwise rotation, while in the conventional ultrasonic motor, two phase driving power is used for generating traveling waves with a high amplitude input pulse.

3. The present invention can be used in semiconductor equipment, medical instruments, hard disk drives and optic disk drives. Furthermore, the cost of the present invention is low and the present invention has enhanced efficiency.

Although a preferred embodiment of the present invention has been described in detail, it will be appreciated that the same may be varied in many ways. Such variations are not to be regarded as a departure from the spirit and scope of the present invention, and all such modifications as would be obvious to one skilled in the art are intended to be included within the scope of the following claims.

What is claimed is:

1. A thin-disc piezoelectric actuating ultrasonic motor, comprising:

at least one rotor;

a piezoelectric element including a metal back plate and a piezoceramic connected by a lead to an AC power source, wherein when single phase AC power is supplied to said piezoceramic, traveling waves are caused to propagate in said metal back plate;

a first fixing plate connected to the metal back plate by at least one first screw extending through said first fixing plate and metal back plate, said at least one first screw causing reflection and interference of said traveling waves in said metal back plate, resulting in traveling waves having both radial and transverse components; and a second fixing plate connected to the first fixing plate by a spring, thereby enabling the first fixing plate and piezoelectric element to vibrate relative to the second fixing plate in response to said traveling waves, wherein said at least one rotor periodically contacts an edge of said piezoelectric element as a result of said vibrations, and said transverse components of said traveling waves are thereby transmitted to said rotor to cause said rotor to rotate.

2. The thin-disc piezoelectric actuating ultrasonic motor as claimed in claim 1, wherein said piezoelectric element is arranged to expand and contract when single phase AC power is supplied to said electrode, thereby causing said traveling waves to propagate in said back plate.

3. The thin-disc piezoelectric actuating ultrasonic motor as claimed in claim 2, wherein said metal back plate is made of a metal alloy.

4. The thin-disc piezoelectric actuating ultrasonic motor as claimed in claim 1, wherein the second fixing plate is a rectangular plate connected to one side of the first fixing plate by a shaft-forming screw that extends through both the first and second fixing plates and serves as a rotary shaft, and to the other side of the first fixing plate by a first spring-supporting screw that extends only into the first fixing plate and a second spring-supporting screw that extends only into the second fixing plate, said spring having ends fixed to said first and second spring-supporting screws to form a resilient coupling between said first and second fixing plates.

5. The thin-disc piezoelectric actuating ultrasonic motor as claimed in claim 1, wherein said at least one first screw includes three screws positioned around a periphery of the piezoelectric element.

6. The thin-disc piezoelectric actuating ultrasonic motor as claimed in claim 1, wherein a number of said rotors is three.

7. A method of driving a thin-disc piezoelectric actuating ultrasonic motor, comprising the steps of:

applying single phase AC power to a piezoelectric element including a piezoceramic affixed to a back plate, thereby causing said piezoceramic to vibrate and induce traveling waves in said back plate; and causing said traveling waves to reflect off of screws that fix the piezoelectric element to a first fixing plate, said traveling waves thereby including radial and transverse components; and limiting movement of the piezoelectric element to a path defined by first and second fixing plates, said first fixing plate being fixed to the piezoelectric element and coupled to the second fixing plate by a resilient connection, the radial and transverse components of the traveling waves respectively causing the piezoelectric element to periodically contact a rotor and impart rotational energy to the rotor.

8. The method of driving a thin-disc piezoelectric actuating ultrasonic motor as claimed in claim 7, further comprising the step of limiting movement of the piezoelectric element to a path defined by first and second fixing plates, said first fixing plate being fixed to the piezoelectric element and coupled to the second fixing plate by a resilient connection.

9. A method of driving a thin-disc piezoelectric actuating ultrasonic motor as claimed in claim 8, wherein said radial and transverse components of said traveling waves cause said piezoelectric element to move along an elliptical path relative to said second fixing plate and said rotor.

10. A method of driving a thin-disc piezoelectric actuating ultrasonic motor as claimed in claim 7, wherein the step of causing said traveling waves to reflect includes the step of causing said traveling waves to reflect in three different directions and thereby enable three said rotors to be driven in different directions by said stator.

11. A method of driving a thin-disc piezoelectric actuating ultrasonic motor as claimed in claim 7, wherein a number of said screws is three.

12. A method of driving a thin-disc piezoelectric actuating ultrasonic motor as claimed in claim 7, wherein the step of supplying power to said piezoelectric element comprises the step of supplying AC power having a frequency range of between approximately 10 kHz and 200 kHz.

* * * * *